United States Patent Office 3,522,677
Patented Aug. 4, 1970

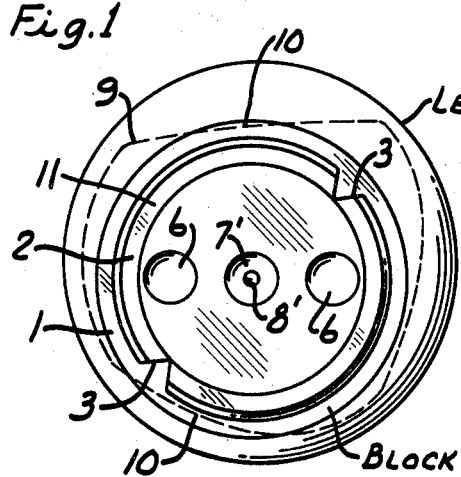
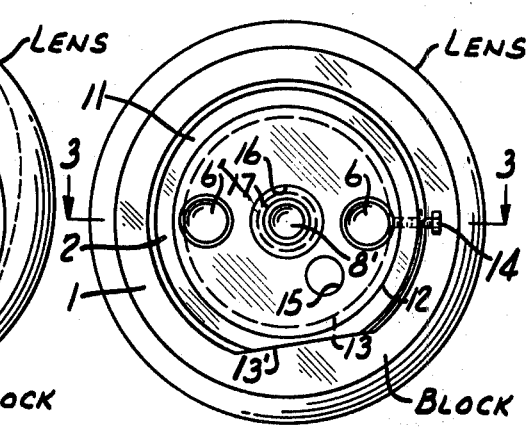
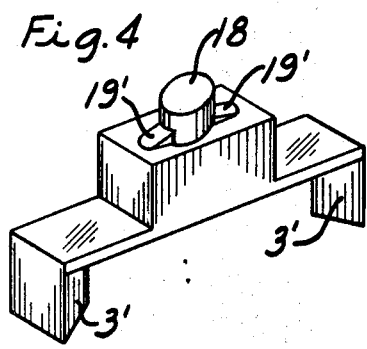
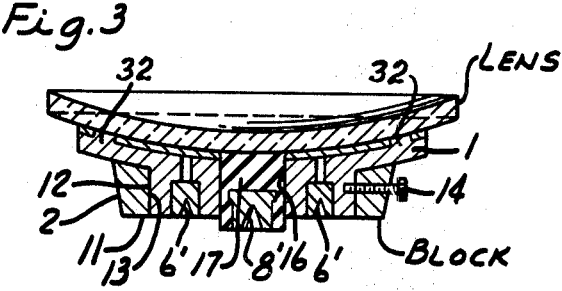
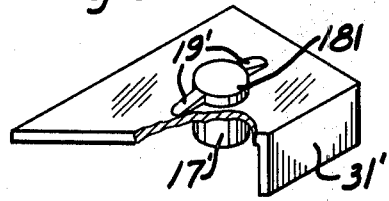
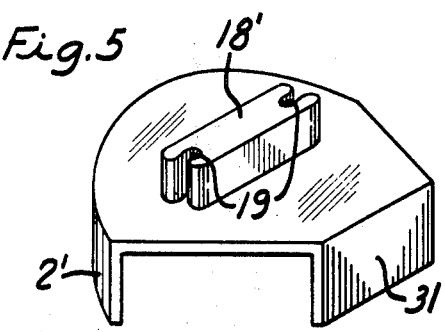
INVENTORS
RICHARD J. McCALL
BY & ROBERT C. IRWIN
CAROTHERS & CAROTHERS
THEIR ATTORNEYS

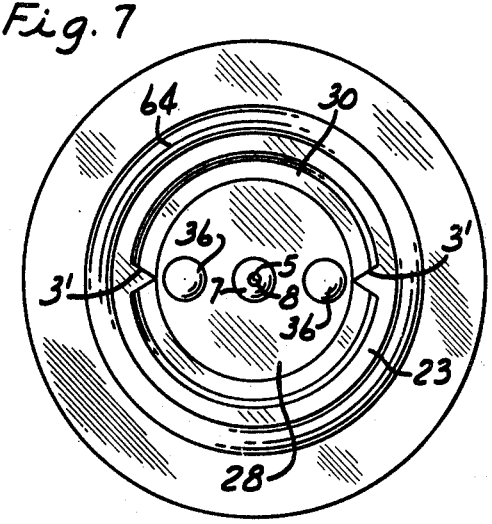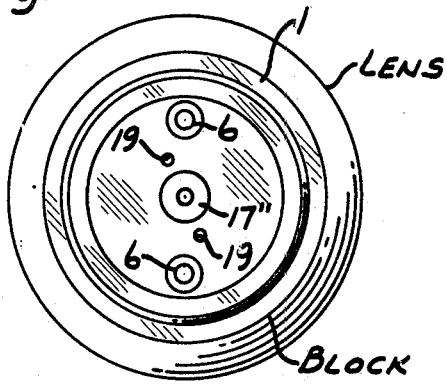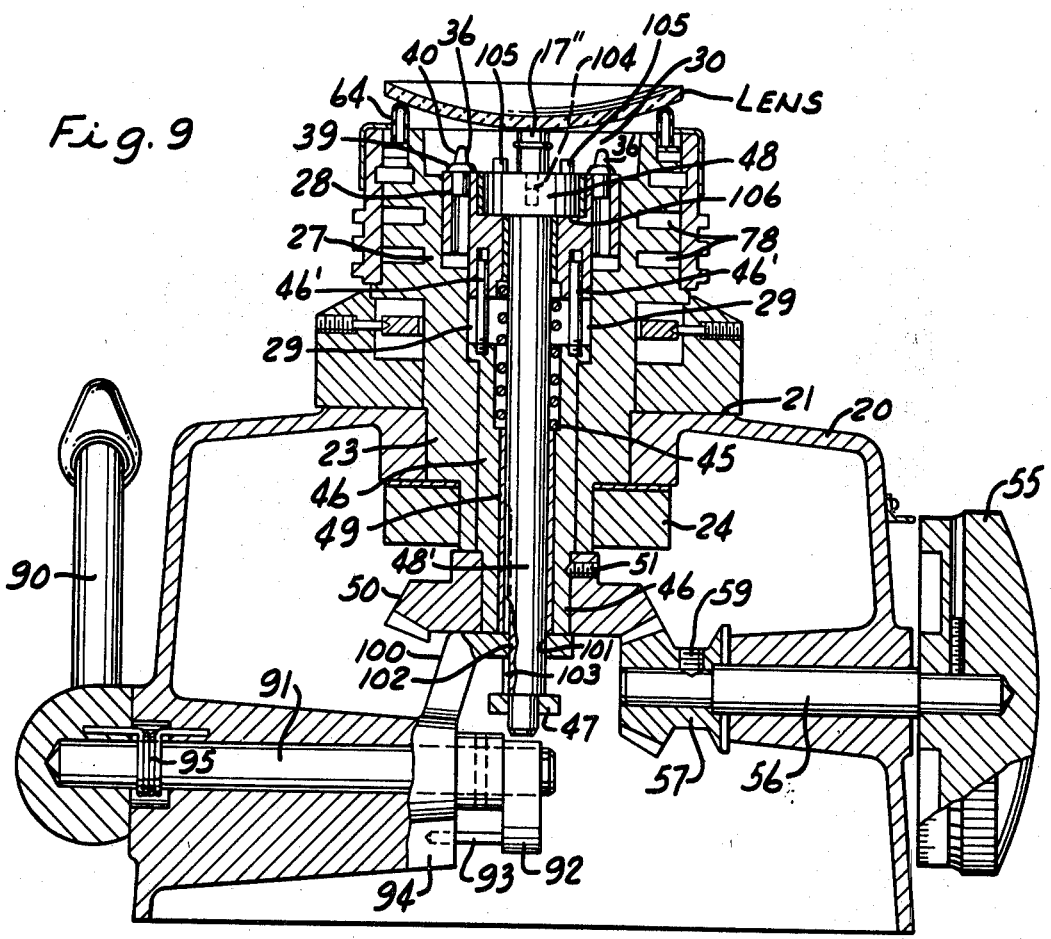

3,522,677
METHOD FOR GENERATING A LENS
Richard J. McCall, Summer Hill, and Robert C. Irwin, Stony Creek Township, Pa., assignors, by mesne assignments, to Shuron/Continental Division of Textron Inc., Rochester, N.Y. and Providence, R.I., a corporation of Rhode Island
Filed May 1, 1967, Ser. No. 635,232
Int. Cl. B24b 1/00
U.S. Cl. 51—284       1 Claim

ABSTRACT OF THE DISCLOSURE

A lens block is molded around a removable, resilient shield plug, which registers with the ocular vertex surface area of the blank, so that the block will have reference surfaces which locate the lens horizontal layout line and permit the blocked lens to be properly chucked first in a lens edge grinding machine and then in a surfacing machine for generating the lens to prescription. The plug is removable to permit checking the lens through the exposed ocular vertex area, to monitor the progress of the generating operation.

CROSS REFERENCES

Copending application Ser. No. 599,591, filed Dec. 6, 1966, and copending application Ser. No. 628,970, filed Apr. 6, 1967.

Buckminster: 3,049,766, Sept. 21, 1962, Class 22—58; 3,192,676, June 6, 1965, Class 51—216; 3,271,912, Oct. 13, 1966, Class 51—216.

Buckminster Pat. No. 3,049,766 is incorporated herein by reference to complement the disclosure as certain embodiments of the present invention are inventive improvements in the Buckminster lens blocking apparatus as disclosed therein.

BACKGROUND OF THE INVENTION

Field of the invention

The present invention relates to the manufacture of ophthalmic lenses, and more particularly to the blocking of lenses so that they can be chucked in the machines for generating and polishing their surfaces and for edge grinding them.

Description of prior art

Buckminster Pat. No. 3,049,766 should be referred to for an explicitly detailed description of the prior art.

In the conventional processes for manufacturing an ophthalmic lens, a lens blank of molded glass or plastic is ground and polished on each of its two sides sucessively and then is ground on its perimeter or edge. Usually one side is concave and the other convex; and the two surfaces have different curvatures so that the thickness of the lens varies at different points. The shapes and spacial relation of the two surfaces determine the desired optical refraction.

In the grinding and polishing operations, the blank is normally secured to a lens block. The lens block may be of the permanent hard metal type or of the low melting point metal type block which is molded to the lens. The hard metal block is generally secured to the lens blank by means of an adhesive such as molten pitch or by a low melting point alloy. The lens block serves as a means to chuck the lens in the grinding and polishing machines.

Regardless of which block type is used, it usually must be removed for edge grinding the lens and replaced with another block of smaller diameter for this purpose. The block for holding the lens blank during surfacing has to be large enough to back up the glass or plastic lens to avoid breakage, while the block used for holding the lens blank during edging generally has to be small enough to clear the grinding wheel during the edge grinding operation.

In order for the lens to have the desired ophthalmic properties the unfinished side of the semifinished lens must bear an exact and precise relation to the first finished surface of the blank which is mounted by the lens block. The precise location of the second surface with respect to the first may require either or both of two adjustments or settings, one called "axis" and the other called "prism." Setting for the axis or cylindrical axis involves a rotation of the second surface with respect to the first, and setting for prism involves a tilting of the second surface with respect to the first. Adjustment for prism, as well as for axis, may be achieved in the blocking operation if so desired.

When the permanent or hard metal type block is employed, the setting for axis is accomplished by orienting or rotating the block about the optical vertex or center of the lens. However, the setting for prism is generally incorporated in the grinding machine chuck.

When the soft low melting point lens block is used, both of these settings are generally incorporated in the block mold before the block is molded. Thus the desired prism and axis settings are to be imparted to the lens are incorporated in the block itself.

The soft metal block is manufactured by a lens blocking apparatus which has a mold cavity therein. The lens blank is positioned on top of the mold and a heated low melting point alloy is flowed into the mold on one side of the lens blank, and is then allowed to cool adhering itself to the blank. This type of apparatus employs an annular seal or seat about the mouth of the mold upon which the finished surface of the lens blank is seated. The desired amount of prism is incorporated into the mold cavity by tilting the lens seat. The bottom of the mold cavity is provided with a rotatable piston having diametrically arranged pins projecting into the cavity which form bearing recesses in the molded block for chucking the same in cylindrical and spherical generating machines.

The lens is seated on the annular seat such that its ocular vertex or center, as prescribed, is centered over the central pin in the bottom of the mold cavity. The bearing point formed by the center pin is utilized for the transmission of spherical grinding forces.

Molten metal is supplied from a hopper into the lens block mold to fill the mold cavity. Means is provided for flowing water or other coolants around the mold when the pouring operation is completed to solidify the molten metal. The rotatable piston is then urged upwardly breaking the molded block away from the mold cavity.

Regardless of which lens block type is employed, the lens edge will overhang the perimetral edge of the block. This may be accentuated at some portions of the overhanging edge more so than at others because the lens block by necessity must be centered over the ocular center of the lens rather than the mechanical center of the lens. During surfacing or grinding of the mounted lens the overhanging lens portion is flexed or warped repeatedly due to the fact that no backup surface is provided. This causes the lens to be driven into the perimetral hard edge of the block thereby forming a permanent ring on the finished surface of the lens which renders it useless. This is found to be more common with the plastic lens which has greater flexing qualities than does the glass lens blank.

Flexing of the lens overhang causes the lens to become warped all the way into the center of the lens due to the flexing about the fulcrum point set up by the perimeter of the lens block. As a result the lens is distorted and its molecular structure is broken down rendering it useless.

Others have tried to solve this problem by using a larger lens block which covered practically the entire area of the finished lens surface. The block was secured to the lens with an epoxy which proved to be messy and time-consuming and therefore not desirable or practical from a laboratory standpoint.

The problem could also be overcome by edging or grinding off the lens edge before the grinding and polishing operations are initiated. However prior to the present invention this would have to be done in an arbitrary manner while the lens was mounted by its lens block, or an edging block would have to be applied to the lens blank before the lens block for generating and polishing is applied. This, however, would consume valuable time and would require the application of an edging block not only after polishing of the lens but also before.

SUMMARY OF INVENTION

The present provides a lens block which may be used not only for generating and polishing the lens, but it also provides a block for edge-grinding the lens before the operations of generating and polishing are initiated, and thereby makes possible a new and novel method of generating a lens whereby the excessive lens edge is removed before generating and polishing the lens by using the same lens block. Removal of the excessive lens edge overhanging the lens block prevents lens warping and flexing thereby saving additional manufacturing time, cost and material.

The lens block normally used for lens grinding and polishing is provided with indexed chucking means or reference surfaces which permit the mounted lens to be chucked relative to the lens horizontal layout line in an edge grinding machine. The reference surfaces may consist of a flat surface, notches or the like, in the perimetral edges of the block or small recesses or projections located adjacent the axial center of the face of the block. The lens is blocked such that its horizontal layout line is positioned parallel with the reference surfaces or at a known angle therewith.

Instead of chucking the blocked lens directly in the edge grinding machine, an adaptor may be mounted on the block in mating engagement with the reference surfaces, and may be provided with a smaller edging block for chucking in conventional edging machines using a small chuck.

A hard metal or permanent lens block of the type disclosed in the aforementioned copending application Ser. No. 628,970 may be employed in the method of generating a lens as taught by the present invention wherein the lens edge is ground before generation and polishing. However the excess lens edge may be ground only to the block perimeter. When the soft, low melting point metal block of the type described in the other cross references previously set forth is used, the overhanging lens edge may be reduced beyond the perimetral edge of the block as the soft metal of the molded block is easily removed by the edge grinding machine along with the excessive glass or plastic. In either instance, the time required to generate and polish the lens is reduced as there is less lens surface area to work with and the lens will not be damaged from repeated flexing.

Since the lens block is centered with respect to the optical center of the lens, the preliminary lens edging is by necessity performed with this center as the reference rather than the mechanical center of the lens as is required for finish edging the lens to fit the lens frame in conformity with the prescription. Thus the lens edge which is preliminarily removed may be taken off in amount and shape close to that of the finished lens for example within 4 mm. of the desired finished edge, but no further. Otherwise, when the polished lens is reblocked for edge grinding in accordance with a template shape generated about a different lens center, it would be discovered that too much lens edge had already been removed along portions of the lens edge and the lens would have to be discarded.

When the soft melting point metal type block is employed, the lens blocking apparatus of the present invention provides the indexed chucking means on the block to permit the mounted lens to be chucked relative to its horizontal layout line for edge grinding. The apparatus of the present invention constitutes a new and novel improvement over the apparatus of Buckminster. This improvement is accomplished by either of two structural embodiments. In the first structural embodiment the apparatus of Buckminster is provided with fixed reference surfaces on the side walls of the mold cavity. These reference surfaces may be in the form of diametrically opposed wedges or a flat surface forming a cord section of the circular mold cross-section to form the desired reference surfaces on the lens block as previously described. The lens blank is seated on the mold and oriented such that its horizontal layout line intersects or is parallel with the line of reference provided by the fixed reference surfaces on the walls of the cavity. The piston is then rotated in the bottom of the mold cavity to provide the proper cylindrical axis setting by rotating the diametrically aligned pins thereon which form the bearing recesses in the molded block.

The second structural variation of the lens blocking apparatus of the present invention provides centrally located pins, or similar means to form indexed chucking surfaces, in the bottom of the mold cavity which remain stationary while the perimetral portion of the piston retaining the pins to form the outside cylindrical bearing recesses is permitted to rotate thereabout.

Thus a collar is received in the bottom of the mold cavity for axial rotation and a cylinder is received within the collar which is fixed against axial rotation but permits relative axial rotation with the surrounding collar. Means to provide bearing points on the finished lens block for the transmission of cylinder generating forces to the lens is provided on the collar. Thus the collar may be rotated to align this means with the cylindrical axis of the lens. Another molding means is provided on the surface of the inner cylinder, which is exposed on the mouth of the mold cavity along with the collar, to provide a centrally located indexed mount on the finished lens block for mating with a lens edging chuck.

The inner cylinder may also be provided with a central pin projecting axially into the mold cavity to provide a central bearing recess in the molded block to receive transmission of spherical generating forces from a generating or polishing machine. Instead of this central pin, the inner cylinder may be provided with a central axially aligned recess to receive the stem of an inverted shield plug of the type disclosed in the aforementioned copending applications.

Other objects and advantages appear hereinafter in the following description and claim.

The accompanying drawings show for the purpose of exemplification, without limiting the invention or claim thereto, certain practicable embodiments illustrating the principles of this invention wherein:

FIG. 1 is a bottom plan view of a lens mounted by a low melting point lens block incorporating the principles of the present invention.

FIG. 2 is a bottom plan view of a hard metal lens block mounted on a lens and incorporating the principles of a further embodiment of the present invention.

FIG. 3 is a cross-sectional view in side elevation taken along line 3—3 of FIG. 2.

FIG. 4 is a perspective view of an adaptor having an edging block for mounting the lens block of FIG. 1.

FIG. 5 is a view in perspective of an edging block adaptor made in accordance with another embodiment of the present invention.

FIG. 6 is a fragmentary view in perspective of an edging block adaptor made in accordance with a structural modification of the adaptor shown in FIG. 5.

FIG. 7 is a plan view of a mold used with the lens blocking apparatus of the present invention and illustrating the interior of the mold cavity.

FIG. 8 is a bottom plan view of a lens mounted by a lens block and illustrating another embodiment of the lens block of the present invention.

FIG. 9 is a cross-sectional view in front elevation of lens blocking apparatus of the present invention for the manufacture of the block shown in FIG. 8.

Referring to FIG. 1 of the drawings, the lens block illustrated is made from soft metal, being molded on the exterior surface of the lens which may be first coated with plastic material or a tape. The lens illustrated may be a glass lens or a lens molded of plastic material.

The lens block is provided with a cylindrical head portion 1 having a frusto-conical shank portion 2 projecting therefrom and terminating in a circular flat surface that is normal to the axis of the lens block. Opposed perimetral notches 3 are provided in the frusto-conical shank portion 2 in line with the center of the lens block. The notches 3 provide indexed reference surfaces which locate the horizontal layout line of the blocked lens. When the lens block is initially poured with material of a low melting point, the notches 3 are formed by the indexed surfaces 3' on the side walls of the mold cavity as illustrated in FIG. 7.

For simplification and comparison, most of the lens blocking apparatus illustrated in FIGS. 7 and 9 is provided with the same reference numerals as found in the Buckminster disclosure, Pat. No. 3,049,766.

To block the lens shown in FIG. 1, the lens is seated on the annular seat or seal 64 (FIG. 9) encompassing the mouth of the mold cavity 30 such that the optical center of the lens is positioned over the center 5 of the mold. The lens horizontal layout line is then aligned with the reference surfaces 3' and the pins 7 and 36 which are secured to the piston 28. At this time the pins 36, which provide the cylindrical axis bearing points on the molded block, are located at an axis setting of 0° from the horizontal. The piston 28 is then rotated to provide the desired axis setting.

After the hot molten metal has been introduced into the mold 30 and has been permitted to solidify the blocked lens is removed by urging the piston 28 upwardly.

The finished lens block is thereby provided with the outside recesses 6 for cylindrical generation of the lens and the center bearing recess 7' for transmission of the spherical generating forces to the lens. The central recess 7' has a small opening 8' in the bottom thereof which exposes a small portion of the lens surface for the insertion of calipers to measure the lens thickness.

The blocked lens of FIG. 1 may then be chucked in an edging machine chuck provided with surfaces for mating engagement of the indexed reference surfaces 3. The lens is thereby chucked relative to its horizontal layout line and its overhanging or overlapping edge may be removed in accordance with the desired lens shape as indicated by the dashed line 9. However, since the lens block is centered over the optical center of the lens rather than its mechanical center, the edge portion may not be removed to the desired final or finished shape. Otherwise, when the polished lens is reblocked for final edge grinding in accordance with the lens frame opening, it will be discovered that too much of the lens edge has already been removed along portions thereof. Therefore the overhanging portion is generally ground down to within, for example, 4 millimeters of the finished shape.

As indicated at 10 in FIG. 1, portions of the soft metal block may be removed by grinding along with the lens edge to produce the desired shape. However, when the hard metal type block is employed as shown in FIG. 2, the lens edge may not be removed beyond the perimetral edge of the head portion 1.

The conventional edge grinding machines are provided with a chuck of smaller diameter than the lens block. However, the block of FIG. 1 may be readily adapted to be received in such a chuck. For this purpose an adaptor is illustrated in FIG. 4 wherein a small edging block 18 is provided with the reference wedges 3' for mating engagement with the reference surfaces 3 of the lens block of FIG. 1. Thus when the adaptor of FIG. 4 is mounted on the lens block the projections 19' of the edging block 18 are properly aligned with the lens layout line. This is due to the fact that projections 19' are aligned with the wedge points formed by the reference surfaces 3'.

The hard metal block of FIGS. 2 and 3 is generally provided with the same structural features of the block shown in FIG. 1. However, the frusto-conical shank portion 2 thereof comprises a ring or collar 11, which is rotatable on the outside of and is slidably engaged with the cylindrical surface 12 of the block. The surface 12 has an annular groove 13 therearound to receive the tip of the set screw 14 threadably engaged with and passing through the collar 11. The shank portion 2 contains two bearing inserts having aligned recesses 6' for use in cylindrical generation. Once the lens and lens block have been oriented with respect to each other for axis, a molten alloy is poured through the opening 15 into the space beneath the lens blank between the spaced projections 32 on the upper face (FIG. 3) of the block, to seat and secure the block to the lens with the series of recesses 6' and 8' aligned with the prescription cylindrical axis of the lens. The collar 11 is thereafter rotated and locked such that the reference surface 13' is parallel to the horizontal layout line of the lens.

This particular hard metal block is provided with a central opening 16 which receives the resilient shield plug 17 which exposes the ocular vertex area of the lens when removed and seals the same when inserted.

The central bearing 8' is vulcanized into the shield plug 17. The reference surface 13' may therefore be aligned with the horizontal layout line by mounting the blocked lens in a vertimeter, by which the properties of the lens may be determined by viewing through the window provided by the opening 16, and rotating the main portion of the block relative to collar 11.

Again this hard metal block may be chucked directly in an edge grinding machine having mating surfaces to engage the reference surface 13'. However, most conventional edge grinding machines are provided with a chuck of a diameter smaller than that of the lens block. In this instance an adaptor such as that shown in FIG. 5 is positioned or mounted on the block of FIGS. 2 and 3. The adaptor of FIG. 5 is provided with an edging block 18' having the diametrically opposed recesses 19 at its outer ends to receiving mating pins of an edge grinding chuck.

The frusto-conical side wall 2' of the adaptor is provided to mate with the frusto-conical shank portion 2 of the lens block while the flat side wall 31 is in mating engagement with the reference surface 13' of the hard metal block. The surface 13' properly aligns the edging block 18' with the horizontal layout line of the lens, since the block 18 and the recesses 19 are aligned in parallel with the surface 31 and hence with the lens horizontal layout line.

The lens block as gripped by the adaptor of FIG. 5 is maintained in the edge grinding chuck by a resilient backup surface pushing on the unfinished lens surface.

The adaptor of FIG. 6 eliminates the frustoconical wall 2' of the adaptor as shown in FIG. 5 and substitutes therefore a central resilient plug 17' to be received in mating engagement with the central opening 16 of the hard metal block. The edging chuck 18' of FIG. 6 illustrates a slight modification of that shown in FIG. 5 wherein the recesses 19 are substituted by the projections 19' to be received in mating engagement in the edging chuck.

Referring to the mounted lens of FIG. 8, the low melting point soft lens block is provided with the recesses 19 molded directly therein which serve the same function as the recesses 19 found in the adaptor shown in FIG. 5. Referring again to FIG. 8, the mounted lens is also provided with recesses 6, and with the shield plug 17" which is inserted into the mold cavity of the lens blocking apparatus prior to molding the block. The lens block thus illustrated is manufactured by the lens blocking apparatus shown in FIG. 9.

The lens blocking apparatus of FIG. 9 may be readily compared with FIGS. 2 and 3 of the Buckminster patent to determine the specific structural features of the present invention over this prior art. The apparatus of FIG. 9 is in all other respects identical to that shown in FIGS. 1, 2 and 3 of the Buckminster patent. A portion of the upper surface 21 of the base 20 is inclined to the horizontal. Mounted in the base, and keyed against rotation thereto is a block mold 23. This mold is held against upward movement by a collar 24 which is fastened to the mold by screws which may be observed in FIG. 2 of the Buckminster patent, and which engages under the inclined top wall of the base. Mounted to reciprocate in a counter bore 27 in the upper end of the mold is a piston or collar 28. The piston is of reduced diameter at its lower end; and the reduced diameter portion of the piston is adapted to slide in the guide bore 29 of the mold. The counter bore 27 communicates with the guide bore 29 at its lower end; and at its upper end communicates with the mold cavity 30 in the upper end of the mold. Guide bore 29 communicates at its lower end with the reduced diameter coaxial main bore of the mold. Secured in the upper end of the collar 28 are two pins 36. These pins are arranged diametrically of the collar and each has a pressed fit in the collar. These two end pins 36 are alike. Each has a truncated conical portion 39 seating against the upper face of the collar and projecting thereabove. Each has a domed shaped portion 40 above its conical portion 39.

The collar 28 is constantly urged upwardly by coil spring 45, which seats at its upper end in a recess in the bottom of the collar and which is interposed between the bottom of the collar and the base of a counter bore in the sleeve 46. Slidably received within the central opening of the collar 28 is a piston 48 having a piston rod 48' of circular cross section extending through sleeve 46 in slidable engagement therewith. The sleeve 46 has an integral collar formed on it at its upper end which engages in guide bore 29 to prevent the sleeve from dropping out of the main bore of the mold. The sleeve is journaled in the main bore of the mold 23, and has a bevel gear 50 fastened to it at its lower end by a set screw 51.

The collar 28 is rotatable in the mold by means of a knurled knob 55 which is secured by means of a set screw to a shaft 56 that extends at right angles to the rod or shaft 48'. Shaft 56 has a bevel pinion 57 secured thereto by a set screw 59. The pinion 57 meshes with the bevel gear 50 that is keyed to sleeve 46. Pins 46' are threadably secured in the collar of the sleeve 46 and protrude upwardly into guide bore 29 where they are slidably received within mating holes in the bottom of collar 28. Thus when knob 55 is turned sleeve 46 is rotated along with pins 46' which cause collar 28 to rotate while permitting the same to slide axially. The piston 48 and rod 48' are held against axial rotation by means of the boss 100 secured to the base 20 as indicated and by providing in the slide bore 101 a key 102, which projects slidably into the groove 103 exending longitudinally in the rod 48'. The collar 47 is secured to the lower end of the rod 48' by means of a set screw to prevent removal of the piston 48 and to limit its upper movement.

The upper face of the piston 48 exposed to the mold cavity 30, is provided with a central recess 104 to receive the stem of the inverted shield plug 17". Diametrically aligned with the center recess 104 are two pins 105, which project from piston 48 into the mold cavity 30 to provide the chucking reference surfaces or recesses 19 in the molded block as shown in FIG. 8.

The restriction provided between the cylinder 48 and the rod 48' provides an abutment or annular shoulder 106 which mates with a corresponding shoulder in the central opening of the collar 28 thereby preventing the collar from being removed axially from the cavity 30 while collar 47 is secured to the bottom end of rod 48'.

The pins 36 are thus located angularly about the axis of the collar 28 by the turning of knob 55. This determines the angular position which the molded lens block will occupy in the chuck of a lens manufacturing machine. In other words the angular position of the collar 28 determines the cylindrical axis of the lens being manufactured.

The lens blank to be blocked is seated upon the annular resilient seal or seat 64 encompassing the mouth of the mold cavity 30. The desired prism setting to be incorporated into the molded block is accomplished by tilting the seat 64. The means provided for tilting the seat 64 is not herein described but one may refer to the Buckminster Pat. 3,049,766 to determine its structural operation. It need only be said here that the annular ring or seat 64 can be tilted to any angle to adjust the blank for the desired amount of prism and prism axis by means of a cam rotatable about an axis disposed at right angles to the axis of the rod 48'.

For supplying the molten metal to the mold, a hopper is provided to receive chunks of metal alloy, including previously used lens blocks. The hopper has a heater secured to it for melting down the chunks of metal. The hopper is provided with a passage leading to the mold cavity 30 which may be opened and closed at will to fill the cavity with the molten metal.

Mounted directly on the molding apparatus is a suitable sighting device provided with an eye piece in a retical for aid in aligning the lens blank. This sighting device is aligned directly over the mold cavity 30 and is provided with resilient prongs at its lower end which may be lowered into engagement with the lens blank to maintain the same against the seat 64. The operation of the sighting device and hopper along with their associated parts are shown and described in detail in FIGS. 1, 2 and 3 of the Buckminster patent and their accompanying disclosure.

To maintain the mold cool during the casting operation, and to harden the molten metal in the mold cavity 30, thereby forming the lens block, the mold is provided with peripheral grooves 78 around it at its top portion, and water or other suitable coolant is supplied to these grooves by a conduit which is connected with the collar 24.

After the molded block has cooled, the block is stripped from the mold cavity by forcing the rod 48' upwardly, thereby pushing the piston 48 upwardly. The piston 48 is followed by the collar 28 which is urged upwardly by the coil spring 45. The rod 48 is moved upwardly by manual operation of a lever 90, which is secured to a shaft 91 that is journaled in the base of the machine. This shaft has a cam 92 pinned to it which is positioned to engage the lower end of the rod 48'. A coil spring 95, which surrounds the shaft 91 and which is engaged at one end in the lever arm 90 and at its opposite end in the base 20, serves to urge the shaft constantly to its 0 position where the cam 92 is out of engagement with the rod 48 as indicated in the drawings. A pin 93 is secured to the cam and adapted to engage against the lug 94 in the base to limit the return movement of the shaft 91.

To briefly sum up the operation of the apparatus, the operator seats a shield plug 17" into the central recess 104 of the piston 48. A lens blank is then seated on the seat or ring 64 and the operator sights through the sighting device to locate the ocular center of the lens over the center of the mold. The lens is also positioned such that its horizontal layout line intersects both of the pins 105. The ocular vertex service area of the lens being in engagement with the plug 17" forces the cylinder 48 downwardly along with collar 28. Good sealing engagement is provided between the ocular vertex area of the lens and the upturned face of the resilient shield plug 17" by means of the constant urging imparted by coil spring 45. The operator then adjusts collar 28 rotatably by turning knurled knob 55, pinion 57 and gear 50 while sighting through the eye piece to position the pins 36 for the desired cylindrical axis. He also adjusts the prism axis by rotating the aforementioned cam (not shown) until the upper surface of the lens blank has the proper tilt for its desired prism. The sighting device is adjusted downwardly until the resilient prongs clamp the lens blank on the annular seat 64. The molten metal is then permitted to flow into the mold cavity 30. When the mold cavity is filled with the molten metal the flow is stopped and the molten metal is permitted to harden. The sighting device is raised from the lens surface and the lever 90 is moved to cause cam 92 to force cylinder 48 upwardly to strip the molded block secured to the blank from the mold. The blocked lens is then ready to be chucked in an edge grinding machine for removal of the excessive lens edge overhanging the block in accordance with a desired template shape. As heretofore pointed out, portions of the cylindrical head 1 of the block may be removed during this process where dictated by the template.

As shown in FIG. 2, the shield plug 17" of FIG. 8 may be removed and replaced with the shield plug of FIG. 2 provided with the central bearing recess 8 for spherical generation of the lens. The shield plug 17 or 17" may be removed during the grinding and polishing operations to determine with a vertimeter whether the lens has acquired the desired opthalmic properties.

I claim:

1. The method of generating a lens to prescription comprising the steps of blocking the lens with a low melting point metal block molded with the desired prism and axis properties to the imparted to the lens and around a removable plug shielding the ocular vertex surface area of the lens, grinding away the excessive edge of the blocked lens to a desired shape with reference to the prescribed optical center, generating the blocked lens in accordance with the prescription, removing the plug, and checking the lens power and prism of the blocked lens through the exposed ocular vertex area before removing the lens block.

References Cited

UNITED STATES PATENTS

| | | | |
|---|---|---|---|
| 3,221,378 | 12/1965 | Faas et al. | 51—216 X |
| 3,237,349 | 3/1966 | Faas et al. | 51—277 |
| 3,049,766 | 8/1962 | Buckminster | 51—277 |
| 3,226,887 | 1/1966 | Rudd et al. | 51—284 X |
| 3,192,676 | 7/1965 | Buckminster | 51—277 X |
| 3,383,808 | 5/1968 | Deshayes et al | 51—277 X |

JAMES L. JONES, JR., Primary Examiner